(12) United States Patent
Drakos

(10) Patent No.: US 7,792,485 B2
(45) Date of Patent: Sep. 7, 2010

(54) SATELLITE MONITORING

(75) Inventor: Evripides Drakos, London (GB)

(73) Assignee: Inmarsat Global Ltd., London (GB)

( * ) Notice: Subject to any disclaimer, the term of this patent is extended or adjusted under 35 U.S.C. 154(b) by 69 days.

(21) Appl. No.: 10/597,161

(22) PCT Filed: Jan. 16, 2004

(86) PCT No.: PCT/GB2004/000226

§ 371 (c)(1),
(2), (4) Date: Apr. 16, 2007

(87) PCT Pub. No.: WO2005/067367

PCT Pub. Date: Jul. 28, 2005

(65) Prior Publication Data
US 2007/0207728 A1 Sep. 6, 2007

(51) Int. Cl.
*H04B 7/185* (2006.01)
(52) U.S. Cl. .................. 455/12.1; 455/3.02; 455/3.01; 455/13.4; 455/303; 455/414.1; 455/456.1; 375/133; 342/354; 725/63
(58) Field of Classification Search .............. 455/121, 455/122, 123, 12.1, 24, 3.02, 3.01, 9, 13.4, 455/303, 414.1, 422.1, 423, 427, 429, 456.1; 375/133, 267; 342/354; 725/63
See application file for complete search history.

(56) References Cited

U.S. PATENT DOCUMENTS

| | | | |
|---|---|---|---|
| 3,541,553 A | 11/1970 | Gubin | |
| 5,710,971 A * | 1/1998 | Armbruster et al. | 455/12.1 |
| 6,078,800 A * | 6/2000 | Kasser | 455/303 |
| 6,597,312 B1 | 7/2003 | Hrycak | |
| 6,642,883 B2 | 11/2003 | Jacomb-Hood et al. | |
| 6,965,755 B1 * | 11/2005 | Barrett | 455/12.1 |
| 7,257,418 B1 * | 8/2007 | Chang et al. | 455/458 |
| 2003/0052819 A1 * | 3/2003 | Jacomb-Hood et al. | 342/379 |
| 2004/0127192 A1 * | 7/2004 | Ceresoli et al. | 455/405 |
| 2004/0166801 A1 * | 8/2004 | Sharon et al. | 455/12.1 |
| 2007/0223403 A1 * | 9/2007 | Furuskar et al. | 370/278 |

FOREIGN PATENT DOCUMENTS

| | | |
|---|---|---|
| EP | 1 353 454 A2 | 10/2003 |
| EP | 1 526 605 A1 | 4/2005 |
| EP | 1 353 454 A3 | 10/2005 |

OTHER PUBLICATIONS

European Patent Authority. Partial International Search Report. International Application No. PCT/GB2004/000226. 3 pages. Jun. 4, 2007.

* cited by examiner

*Primary Examiner*—Matthew D Anderson
*Assistant Examiner*—Shaima Q Aminzay
(74) *Attorney, Agent, or Firm*—Sterne, Kessler, Goldstein & Fox P.L.L.C.

(57) ABSTRACT

A multibeam is configured to transmit a duplicate of a channel from one spot beam in another spot beam, which contains a remote monitoring station. The satellite is reconfigurable to select the channel which is duplicated, allowing the beams of the satellite to be monitored, without the need for a remote monitoring station in each beam.

19 Claims, 7 Drawing Sheets

SATELLITE MONITORING

BACKGROUND OF THE INVENTION

1. Field of the Invention

The present invention relates to satellite monitoring, and particularly, but not exclusively, to a method, apparatus, system and computer program for terrestrial monitoring of the transmission performance of a multi-beam satellite.

2. Background Art

Operators of satellite systems need to monitor various transmission properties of their satellites, such as the centre frequencies of frequency channels, carrier to noise ratios (C/No), link quality and Effective Isotropic Radiated Power (EIRP). Some or all of these properties may be measured directly or indirectly by receiving user terminals and reported back to the system, for example to assist in power control, Doppler correction or variable data rate techniques. However, the availability and geographical spread of user terminals is outside the control of the satellite operator, which cannot therefore rely on user terminals for comprehensive monitoring of the transmission properties of a satellite.

Hence, there is a need for permanently active satellite monitoring stations located in representative geographical locations. As an example, a satellite monitoring system currently used for the applicant's Inmarsat-3™ satellites will now be described with reference to FIG. 1.

The Inmarsat™ mobile satellite communications system includes a plurality of geostationary Inmarsat-3™ satellites 2, one of which is shown in FIG. 1. The satellite 2 generates a global beam 6 and five spot beams 8a-e which fall within the global beam 6, the beam patterns being substantially coterminous for transmission and reception. The spot beams 8a-e are used predominantly for communications traffic, while the global beam 6 is used predominantly for call set-up and communications traffic outside the coverage of the spot beams 6.

For each satellite 2, a plurality of land earth stations (LES) 4a-b act as satellite base stations and gateways to terrestrial networks. Each LES 4 communicates at C-band over a bidirectional feeder link 10 via the satellite 2, which maps frequency channels within the feeder link 10 to corresponding beams and L-band channels within the beams, according to a variable channel mapping configured on the satellite 2 under the control of a telemetry, tracking and control (TT&C) station (not shown).

To monitor the spot beams 8, a remote monitoring station (RMS) 12 needs to be located in each spot beam 8. The RMS 12 receives a current frequency plan, monitors L-band channels within the relevant spot beam or beams 8, and records channel measurements from which the required transmission properties of the satellite 2 can be derived. Each RMS must be kept operational as near continuously as possible, and must be calibrated so that the measurement results are reliable; therefore, it is convenient to collocate RMSs 12a, 12b with LESs 4a, 4b so that existing maintenance facilities can be used.

Moreover, the RMSs 12 must transmit monitoring data so that it can be processed by a central server. The data may be transmitted over the satellite network, or over a wireline network such as an ISDN. Therefore, collocated RMSs 12a, 12b have the advantage of being able to use existing communications facilities at the LESs 4a, 4b to transmit this data.

If an LES 4b is located where two spot beams 8c, 8d overlap, the collocated RMS 12b is able to monitor both spot beams 8c, 8d, thus reducing the number of RMSs 12 required.

For those spot beams 8 which do not contain an LES 4, a transportable monitoring station (TMS) 12c, 12d may be provided. The TMSs 12c, 12d are conveniently located where suitable maintenance and/or terrestrial communication facilities are available. However, it is more difficult to provide the necessary maintenance and communications facilities to the TMSs 12c, 12d than to collocated RMSs 12a, 12b.

Whilst the above system is acceptable for monitoring satellites with a small number of spot beams, problems arise in adapting the system for satellites where the number of spot beams is very much greater. For example, the proposed Inmarsat-4™ satellites will generate up to 19 regional beams and 256 spot beams, most of which will not cover an existing LES 4. A very large number of TMSs 12, with a diverse geographical distribution, would be needed to ensure that every regional and spot beam contains at least one monitoring station 12. It would be extremely difficult to maintain such a large number of TMSs, particularly as some spot beams would cover only marine or mountainous areas.

Moreover, the Inmarsat-4™ satellites will have reconfigurable beam patterns, so that a distribution of monitoring stations 12 adequate to monitor one beam pattern configuration may not be adequate to monitor another.

The problems described above are not unique to Inmarsat™ satellite communications systems. As the demand for high-bandwidth satellite communications increases, the number of spot beams required also increases, to provide the necessary gain and frequency re-use for high bandwidth services. The problems are not unique to geostationary satellites, and may be more acute for non-geostationary satellites which generate a moving beam pattern. The problems are not unique to repeater satellites, and may be more acute with switching satellites, which may have fewer terrestrial gateways which can be used for satellite monitoring.

The document U.S. Pat. No. 5,710,971 discloses a satellite monitoring system, for call interception rather than monitoring transmission performance.

BRIEF SUMMARY OF THE INVENTION

According to one aspect of the invention, a multibeam satellite is controlled to transmit a duplicate of a channel from one spot beam in another spot beam, which contains a remote monitoring station. Instead of arranging a monitoring station in the monitored spot beam, the monitored spot beam is duplicated to the monitoring station. The monitored spot beam itself, and the traffic contained within it, need not be affected. In this way, the need to have a monitoring station in each spot beam may be overcome.

Preferably, the duplicate channel contains a duplicate signal having the same modulated content, modulation scheme and power level as the original signal, so that the monitored properties of the duplicate channel are representative of the original channel. The duplicate signal may be shifted in frequency from the original signal. This may avoid interference between the original and duplicate signals, and may facilitate frequency coordination in a frequency re-use pattern. The duplicate channel may be at a frequency reserved for monitoring and not used for original channels. Alternatively, the duplicate signal may partially or completely overlap in frequency with the original channel. In this case, interference may be avoided by spatial isolation between the spot beams containing the original and duplicate channels.

The monitored channel may be a frequency channel containing a variable allocation of user channels divided by frequency, time, code and/or other multiple access methods. The monitoring station may receive a frequency plan identifying the allocation of the user channels to the frequency channel, identify a specific user channel from the frequency plan, and monitor transmission properties of the specific user channel.

Preferably, the monitoring station does not decode the data content of the monitored signal and is not used for call interception purposes.

Preferably, the channel to be duplicated is variable, so that the duplicate channel transmitted to the remote monitoring station is a duplicate of different channels at different times. The channel to be duplicated may be freely selectable from any of the channels in use, subject to any interference constraints.

In the case of a repeater or non-switching satellite, the original and duplicate channels may be generated by the satellite from a single channel received in a feeder link.

The invention may differ from a multicasting technique in which the same channel is transmitted in a plurality of beams for reception by a plurality of users. In a multicasting technique, the allocation of a channel to the plurality of beams is not reconfigured, and may not be reconfigurable, during a multicast transmission. Moreover, a multicast will normally be addressed to a set of receivers and will be transmitted only in the beams within which those receivers are located.

According to the invention, the spot beam within which a transmission is duplicated may be selected independently of the content of the transmission or of any signalling by which the transmission was set up. Instead, the spot beam may be selected to cover a remote monitoring station which is to monitor the transmission. Furthermore, the invention is applicable to transmissions which are set up as unicast transmissions, although it may also be applicable to multicast transmissions.

BRIEF DESCRIPTION OF THE FIGURES

Specific embodiments of the present invention will be described with reference to the accompanying drawings, in which.

DETAILED DESCRIPTION OF THE INVENTION

Figure 1:
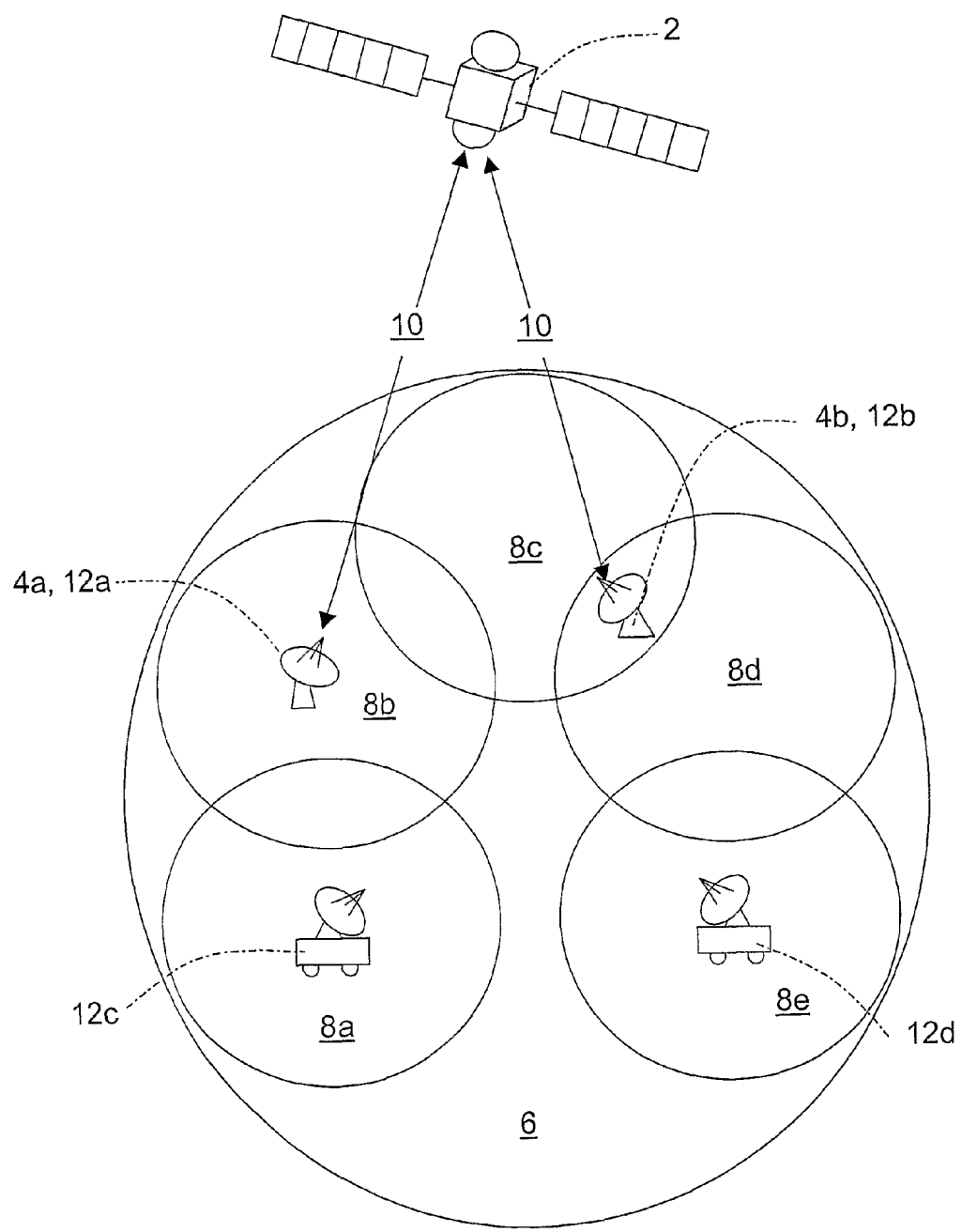
FIG. 1 is a schematic diagram of a known satellite monitoring system.
Figure 2:
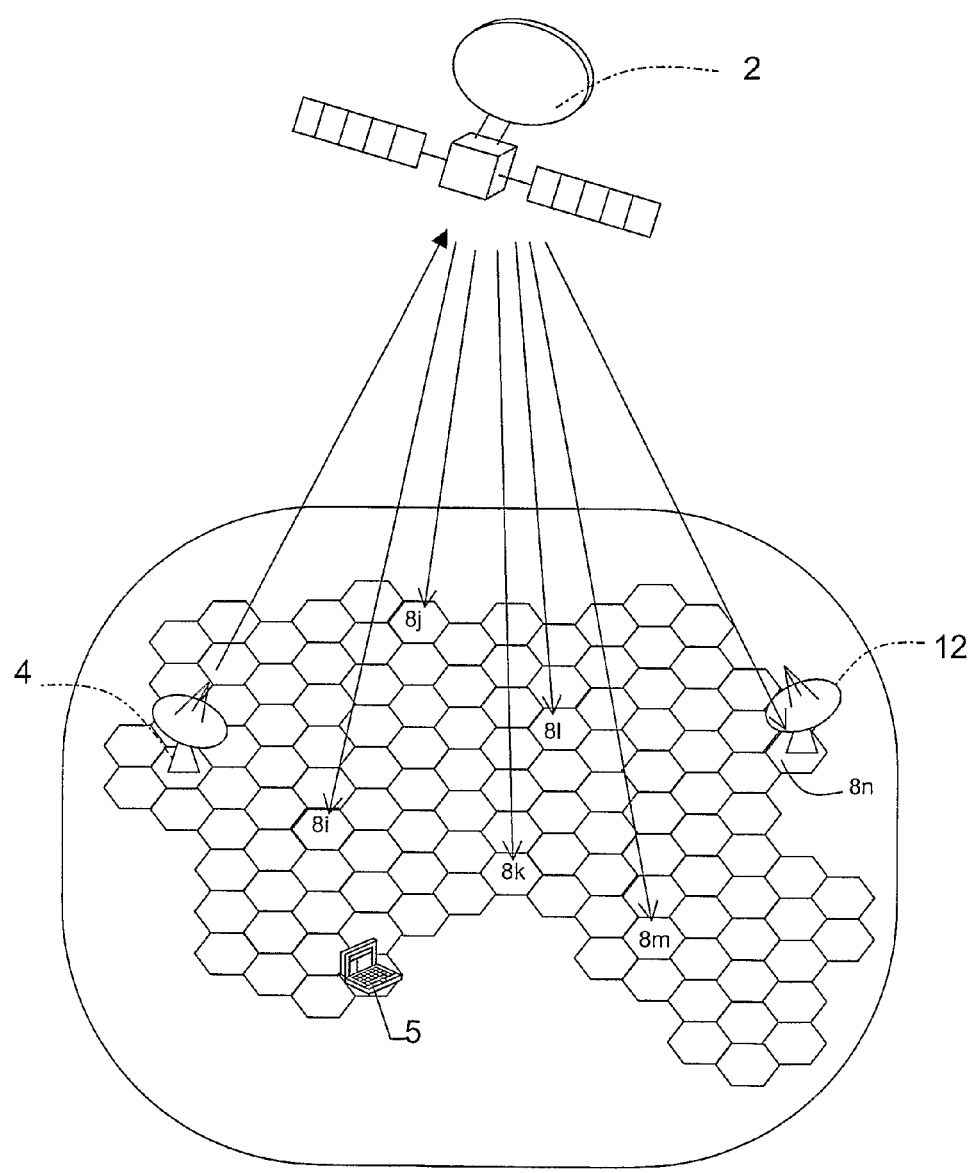
FIG. 2 is a schematic diagram of a satellite communications system incorporating a satellite monitoring system according to an embodiment of the present invention.

FIG. 2 shows schematically a multibeam satellite communications system according to an embodiment of the present invention. A satellite 2 generates a large number of spot beams 8 within the coverage area of its global beam 6. As illustrated in FIG. 2, the spot beams 8 are arranged in an approximately hexagonal beam pattern covering most of the terrestrial and coastal areas within the field of view of the satellite 2. Each beam is represented as having a hexagonal shape, for clarity, but in reality will have an approximately circular shape distorted by the projection of the beam onto the surface of the earth. A frequency re-use pattern may be applied so that the same frequency channel is re-used between spot beams 8 having at least a minimum separation distance.

The spot beams 8 carry user traffic and signalling for reception by user terminals; a representative user terminal 5 is shown in FIG. 2, but the system is able to provide satellite communications services to a large number of such terminals.

An LES 4 provides a feeder link 10 to the satellite; although the feeder link is bidirectional, we need only consider the forward direction in this embodiment. Each frequency channel at C-band in the feeder link 10 is mapped by the satellite 2 to a corresponding spot beam 8 determined by a channel filter configuration on board the satellite 2. Note that different frequency channels in the feeder link 10 may be mapped to the same frequency in different ones of the spot beams separated by the minimum separation distance.

In this example, five representative spot beams $8i$-$8m$ will be considered, although the example can be extrapolated to all of the spot beams 8. None of these spot beams $8i$-$8m$ covers an RMS 12, yet all of them need to be monitored.

In this embodiment, monitoring is achieved by configuring the channel filter to duplicate transmissions in one of the spot beams $8i$-$8m$ into another spot beam $8n$ which is monitored by an RMS 12. The channel filter is reconfigured periodically to select each of the spot beams $8i$-$8m$ in turn for duplicate transmission. The RMS 12 monitors the duplicate transmissions to derive the satellite transmission properties for the corresponding transmissions being duplicated at that time. The RMS 12, or the facility which collects the monitored data, may compensate for any differences in beam geometry between the monitored spot beam $8i$-$8m$ and the spot beam $8n$ containing the duplicate transmissions.

Duplicate Satellite Channel Allocation

Figure 3:
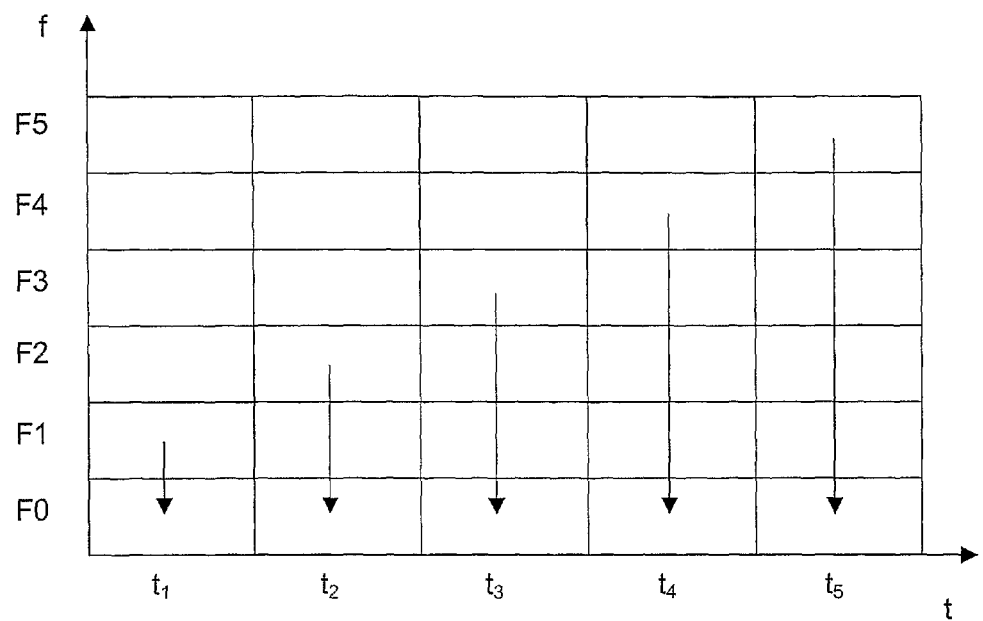
FIG. 3 is a chart showing frequency allocation against time to illustrate the periodic duplication of different beam transmissions.

In this embodiment, the duplicate transmissions for each of the spot beams $8i$-$8m$ are transmitted into the same frequency channel, which is reserved for duplicate transmissions to avoid interference with normal transmissions intended for reception by user terminals. This arrangement is illustrated graphically in FIG. 3, where transmissions in frequency channels F1 to F5 and corresponding to spot beams $8i$-$8m$, are duplicated into the reserved frequency channel FO in spot beam $8n$ in successive time periods t1 to t5.

In an alternative embodiment, there is no reserved frequency channel FO and the duplicate frequency channel is selected from any of the available channels, subject to any interference constraint. This alternative has the advantage that the frequency channel FO can be used for user traffic, thus increasing the frequency usage efficiency of the system. However, it imposes a constraint on the frequency re-use pattern, because two frequency channels are assigned simultaneously to the spot beam $8n$ containing the RMS 12, neither of which frequency channels can be re-used within the minimum re-use distance. The effect of this constraint could be overcome at least partially if the spot beam $8n$ is at the edge of the spot beam pattern.

The duplicate transmission may be transmitted at a significantly lower gain than the original transmission, because the RMS 12 has an antenna gain significantly higher than that of the user-station or stations for which the original transmission is generated.

For example, the gain may be at least 3 dB lower, and preferably 6 dB lower. The lower gain reduces the interference caused by duplicate transmissions. The gain may be sufficiently low that it does not impose a constraint on the frequency re-use pattern.

A selected transmission may be duplicated simultaneously into a plurality of different spot beams for monitoring by a corresponding plurality of different RMS 12. Advantageously, the monitored signals may be compared at a monitoring facility and atmospheric effects attributable to the different paths traveled by the different duplicate transmissions may be cancelled. In this way, the transmission properties of the original signal as transmitted by the satellite may be more accurately determined.

In an alternative embodiment, a known test signal may be transmitted to the satellite and the channel filter configured to transmit the same test signal in at least two different spot beams for monitoring by different RMS. The received test signals may be compared at a monitoring facility in order to measure atmospheric properties along the different paths traveled by the test signal to the different RMS. The atmospheric properties determined in this way may include ionospheric delay, which is frequency dependent. A test signal including components at different frequencies can be used to determine ionospheric delay along each path.

In another alternative embodiment, the RMS 12 may be collocated with the LES 4. Advantageously, the frequency plan may be shared locally between the LES 4 and the RMS 12. This alternative does not pose any additional interference problem, as the feeder link 10 is at C-band, while the spot beam transmissions are at L-band.

Channel Filter Configuration

Figure 4:
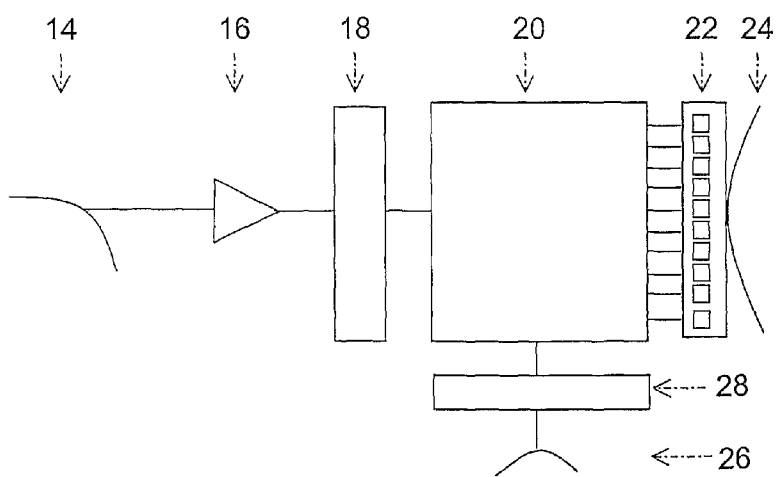
FIG. 4 is a schematic diagram of a satellite payload for use in the embodiment.

The channel filter configuration will be explained with reference to FIG. 4, which is a diagram of a transponder payload within the satellite 2. A C-band antenna 14 receives feeder link channel transmissions from the LES 4, which are amplified by a low noise amplifier (LNA) 16 and digitally converted by an analog-to-digital (A/D) converter 18. A digital beam former and channeliser 20 performs the mapping between feeder link channels and frequency channels in spot beams 8, and outputs a set of analog converted signals which are amplified by a bank of high power amplifiers (HPAs) 22 and fed to a corresponding set of antenna elements in an L-band antenna. The sum of signals radiated by the antenna elements generates the spot beam pattern.

The channel filter configuration is controlled by commands received from a Telemetry, Tracking and Control (TT&C) station by a TT&C antenna 26, demodulated and decoded by a TT&C interface 28 and provided as input to the digital beam former and channeliser 20.

Each frequency channel may be subdivided in frequency and time to define individual user channels, with differing modulation schemes. The format of each frequency channel is transparent to the satellite payload, which provides 200 kHz channelization of transmitted signals, but the RMS 12 must be able to distinguish the individual user channels in order to identify various properties of the user channels, such as the centre frequency and the C/No ratio.

Network Architecture

Figure 5:
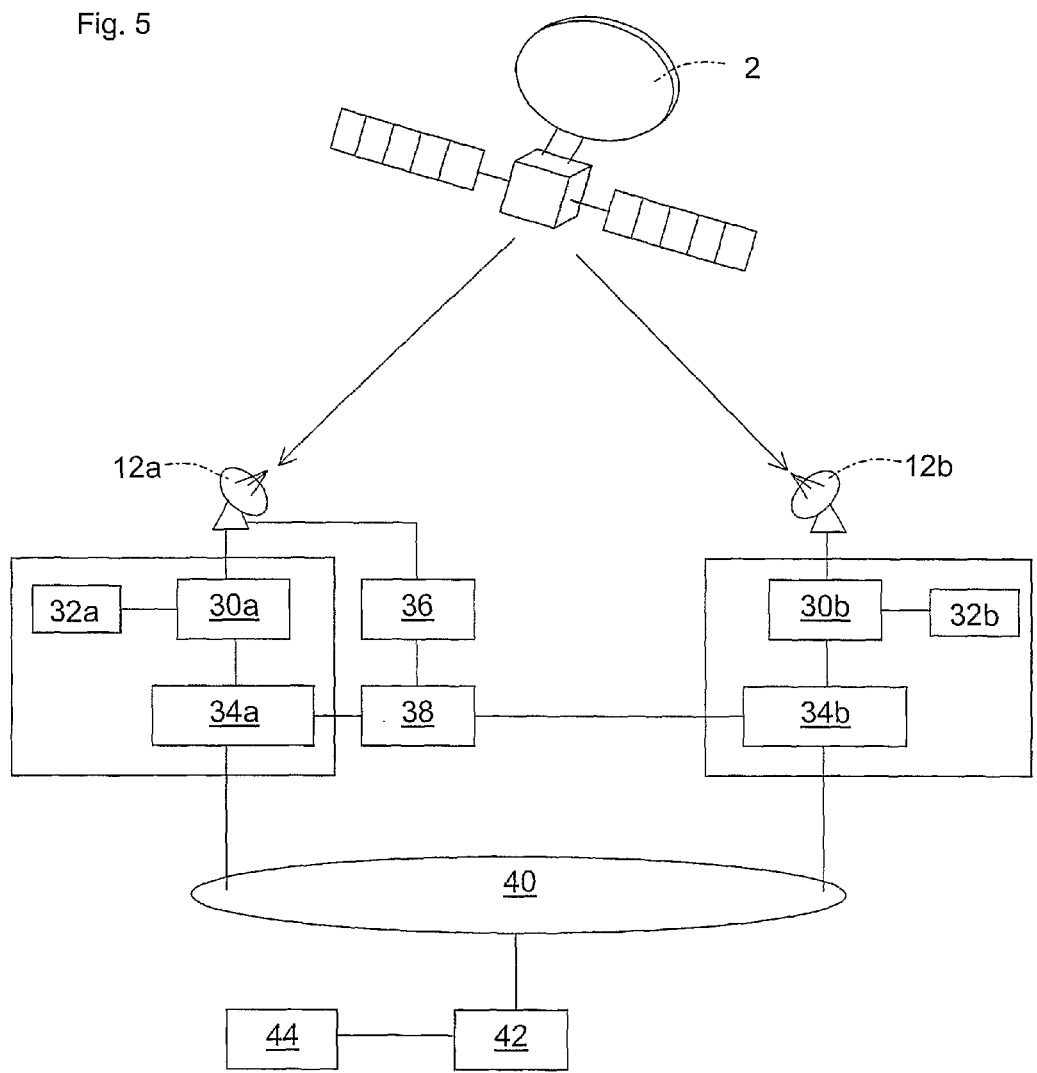
FIG. 5 is a schematic diagram of a network architecture incorporating the satellite monitoring system of the embodiment.

FIG. 5 shows a simplified version of the remote monitoring system network architecture, including representative RMSs 12a and 12b which are preferably co-located with respective LESs 4a and 4b. Each RMS 12 includes a spectrum analyser 30 which is calibrated by calibration equipment 32 and controlled by an RMS controller 34 to perform the required monitoring functions A Global Resource Manager (GRM) 38 stores a map of the satellite filter configuration and controls the satellite 2 to modify the satellite filter configuration through a payload control system 36 which communicates the modifications to the satellite 2 via the RMS 12a or another TT&C station. The GRM 38 copies the map to each RMS 12 and informs the RMSs 12 when duplicate channels have been allocated or deallocated.

In one example of a monitoring method, one of the RMSs 12 requests the GRM 38 to set up a duplicate filter for the channel to be monitored. The PCS 36 sets up the duplicate channel and confirms to the GRM 38 that the channel has been set up. The GRM 38 communicates the confirmation to the RMS 12, which then carries out the measurement, stores the result, and requests the GRM 38 to set up the next duplicate channel. Hence, the timing and order of measurement of the different channels is flexible and can be set up by the RMS 12 according to requirements rather than in a fixed sequence.

Each RMS 12 is connected through a wide-area network (WAN) 40 to a monitoring server 42, which instructs the RMSs 12 to request and measure duplicate channels, and receives the resultant monitoring data from them. The monitoring server 40 also accesses the current frequency plan 44 and distributes information about the intended format of the channel to the relevant RIM 12.

Second Embodiment

In a second embodiment, the satellite 2 is an Inmarsat-3™ satellite having a relatively small number of spot beams. The aim of this embodiment is to reduce or eliminate the requirement for transportable monitoring stations (TMSs) 12c, 12d. A problem associated with this embodiment is that, because the size of each beam is large and the number of different channel sets defined for frequency re-use is small, it is more difficult to avoid interference between the duplicate channel set and the normal channel sets. The duplicate beam must be sufficiently spatially isolated from the normal beams which use the same frequency spectrum.

Channel Filter Configuration

Figure 6:
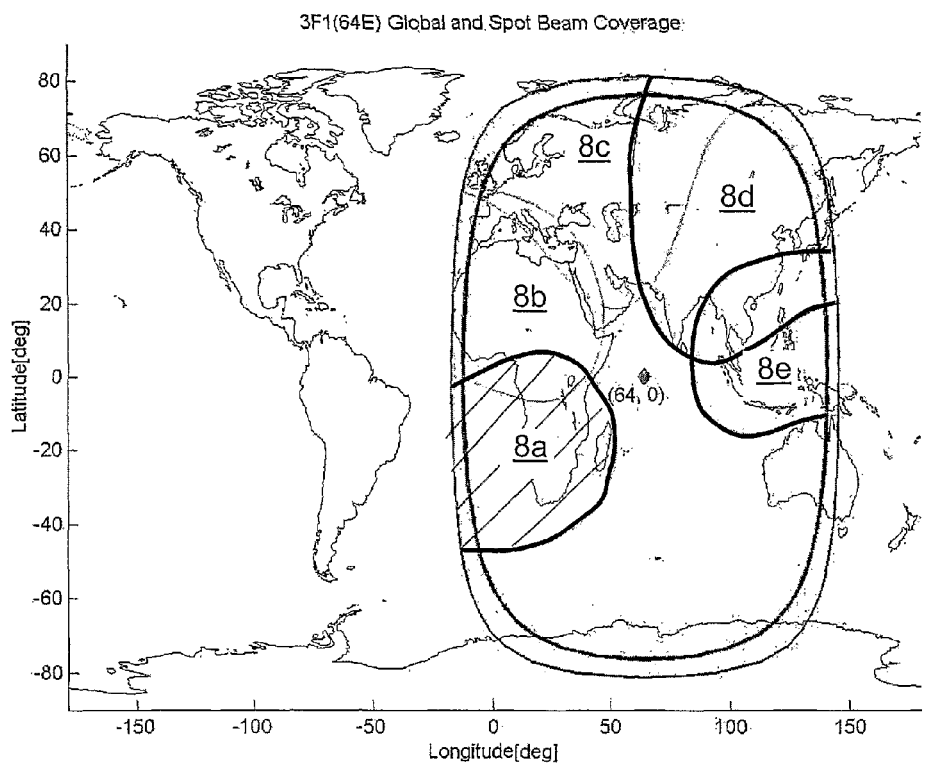
FIG. 6 is a spot beam diagram for a satellite in a first example of a second embodiment of the present invention.
Figure 7:
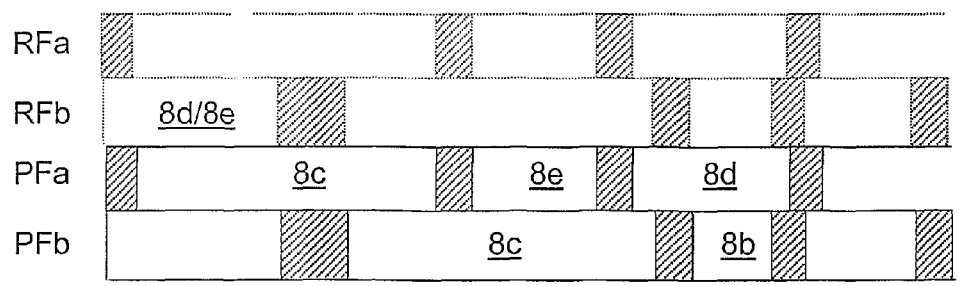
FIG. 7 is a diagram of allocations of frequency bands to beams in the first example.

The Inmarsat-3™ satellite includes a redundant filter which is switchable into the transmission path as a backup if the primary filter fails. However, the redundant filter may also be used in parallel with the primary filter. The redundant filter is driven by a different local oscillator from the primary filter, which may be driven at a different frequency so as to transmit the duplicate channel at a different frequency. In this embodiment, the redundant filter is used to duplicate the channel set to be monitored into a spot beam where one of the RIv1Ss 12 is located. As in the first embodiment, the gain of the duplicate channel may be significantly lower than that of the original channel. FIG. 6 shows an example of the spot beam coverage of the Inmarsat-3™ Indian Ocean Region (IOR) satellite, while FIG. 7 shows the spectrum allocations of the primary filter PF and the redundant filter RF. Any particular frequency channel can be used twice with sufficient spatial isolation, so the frequency allocation of each filter is illustrated for clarity with upper and lower bands RFa, RFb, PFa, PFb. However, it should be appreciated that each band corresponds to the same frequency spectrum.

The reference numerals 8a to 8e indicate respectively the southwest, northwest, north central, northeast and southeast beams, and are used in FIG. 7 to indicate the portion of the frequency spectrum allocated to each beam.

In this example, it is desired to monitor the southwest beam 8a (shaded in FIG. 6). Either the northeast beam 8d or the southeast beam 8e have the necessary beam isolation requirements (>15 dB). The north central beam 8c cannot be used, for reasons of spectrum coordination, as can be seen from FIG. 7. RMSs 12 are located in the northeast beam 8d and the southeast beam 8e (bold outlined in FIG. 7), either of which can therefore be used to duplicate the channel set of the southwest beam 8a.

Figure 8:
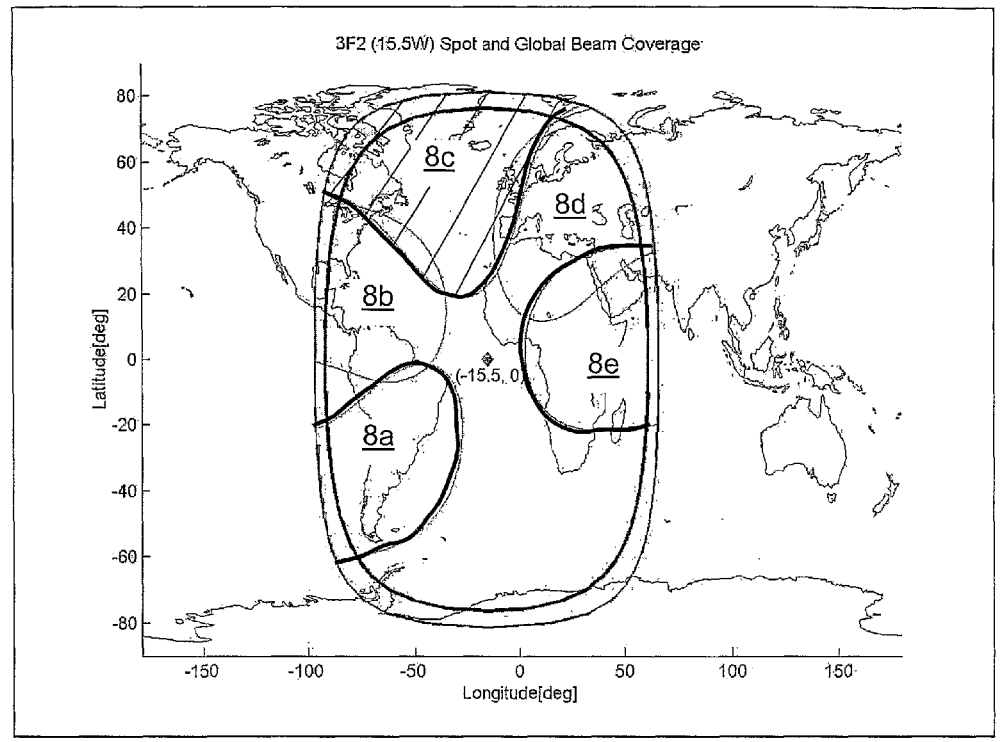
FIG. 8 is a spot beam diagram for a satellite in a second example of the second embodiment.
Figure 9:
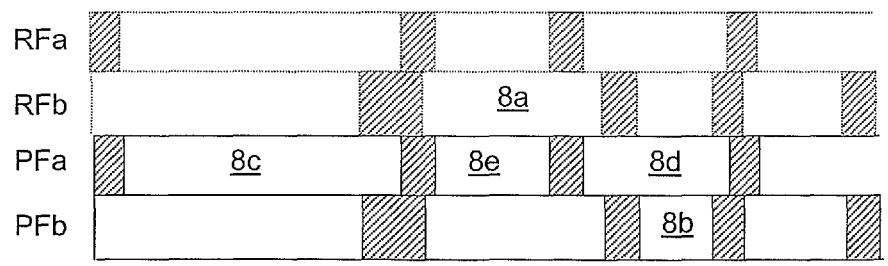
FIG. 9 is a diagram of allocations of frequency bands to beams in the second example.

In a second example, it is desired to monitor the north central beam 8c of the Atlantic Ocean Region East (AOR-E) Inmarsat-3™ satellite, for which the beam coverage pattern is shown in FIG. 8, with the desired beam 8c shaded, and the primary and redundant filter allocation schemes are shown in FIG. 9. Either the southwest beam 8a or the southeast beam 8e have sufficient beam isolation. Neither the southeast beam 8e or the northeast beam 8d can be used, because of spectrum coordination constraints, as illustrated in FIG. 9. Hence, only the southwest beam 8a can be used to carry a duplicate of the north central beam channels.

As a result of the isolation and spectral coordination constraints, it is preferred that at least two RMSs 12 are available for each satellite 2, and these are preferably collocated with an LES 4 to allow re-use of existing facilities.

Network Architecture

Figure 10:
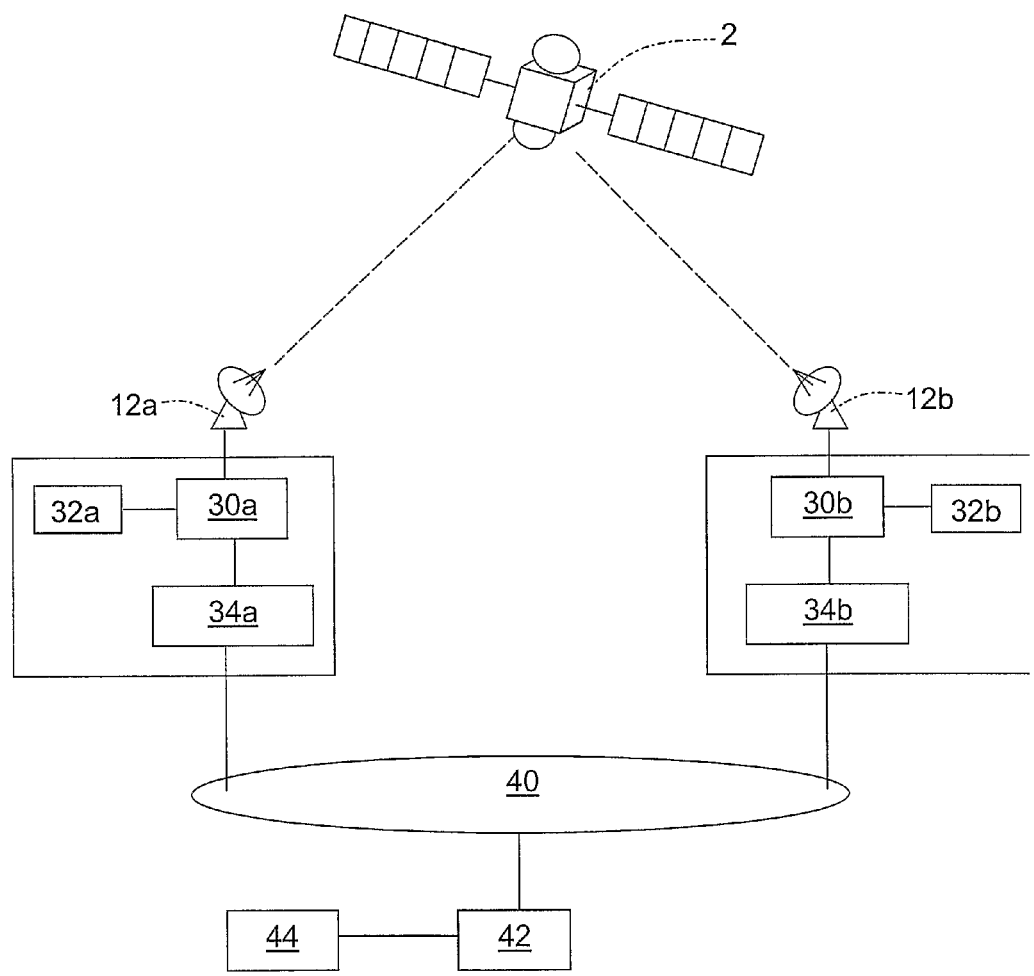
FIG. 10 is a schematic diagram of a network architecture incorporating the satellite monitoring system of the second embodiment.

FIG. 10 shows the network configuration of the remote monitoring system in this embodiment. Like components to those of the first embodiment are indicated by the same reference numerals as those of FIG. 5. Compared with the configuration of the first embodiment, there is no GRM 38 or PCS 36. Instead, each RMS 12 monitors channel allocation signalling on the satellite network to determine the channel allocation within the spectrum to be monitored. The redundant filter is configured by transmissions from the TT&C stations, which maybe collocated with the RMS 12 or LES 4.

Alternative embodiments may be envisaged, which nevertheless fall within the scope of the invention as defined by the claims. As explained above, the problems addressed by the invention are not confined to Inmarsat™ satellites, geostationary satellites or repeater satellites.

What is claimed is:

1. A method of configuring a multibeam satellite to enable remote monitoring of its transmissions, wherein the satellite transmits a signal in a first beam to a user terminal for receiving the signal, the method comprising configuring the satellite to transmit a copy of the signal in a second beam to a remote monitoring station for monitoring the copy, wherein the copy is transmitted in the second beam in a channel different from that used for user data transmission to user terminals in the second beam, and wherein the satellite additionally transmits one or more additional signals in one or more respective additional beams, and wherein the satellite is periodically reconfigured to select different ones of said signal and said one or more additional signals for transmitting a copy thereof in said second beam.

2. The method of claim 1, wherein the copy is transmitted at a substantially lower gain than the signal.

3. The method of claim 1 or 2 wherein the signal and the copy are transmitted at substantially the same frequency.

4. The method of claim 3, wherein the copy of the signal is transmitted in a channel reserved for monitoring by the remote monitoring station.

5. The method of claim 1, wherein the signal is transmitted at a first frequency and the copy is transmitted at a second frequency different from the first frequency.

6. The method of claim 1, wherein a copy of the signal is transmitted in a plurality of different beams, including said second beam.

7. The method of claim 6, wherein the plurality of beams are selected so as each to contain a remote monitoring station for monitoring the copy.

8. The method of claim 1, wherein the satellite is a repeater satellite configurable to convert a feeder link signal, transmitted from a terrestrial gateway to the satellite, to said signal and said copy of the signal.

9. The method of claim 1, wherein the signal contains user data addressed to the user terminal.

10. The method of claim 1, further including transmitting directly or indirectly to the remote monitoring station channel allocation data identifying an allocation of one or more user channels within the signal such that the remote monitoring station monitors the one or more user channels.

11. The method of claim 1, wherein the step of configuring comprises transmitting a configuration command directly or indirectly to the satellite.

12. The method of claim 1, wherein the satellite is periodically reconfigured so that each of said signal and said one or more additional signals is monitored sequentially.

13. A method of monitoring a transmission of a signal by a multibeam satellite in a first beam, the method comprising receiving a copy of the signal in a second beam of the satellite and monitoring the copy of the signal, wherein the copy is received in the second beam in a channel different from that used for user data transmission to user terminals in the second beam, and wherein the satellite additionally transmits one or more additional signals in one or more respective additional beams, and wherein the satellite is periodically reconfigured to select different ones of said signal and said one or more additional signals for transmitting a copy thereof in said second beam.

14. The method of claim 13, wherein the copy of the signal is received at a different frequency from that of the signal.

15. The method of claim 14, wherein the copy of the signal is received in a channel reserved for monitoring.

16. The method of claim 13, wherein the copy of the signal is received at the same frequency as that of the signal, and the second beam is non-adjacent to the first beam.

17. The method of claim 13, wherein the gain of the copy is substantially lower than that of the signal.

18. The method of claim 13, wherein the signal contains user data addressed to the user terminal.

19. The method of claim 13, further including receiving channel allocation data identifying an allocation of one or more user channels within the signal, and monitoring the one or more user channels.

* * * * *